US008521566B2

(12) United States Patent
Chatter et al.

(10) Patent No.: US 8,521,566 B2
(45) Date of Patent: Aug. 27, 2013

(54) SYSTEMS AND METHODS FOR DETERMINING OPTIMAL PRICING AND RISK CONTROL MONITORING OF AUCTIONED ASSETS INCLUDING THE AUTOMATIC COMPUTATION OF BID PRICES FOR CREDIT DEFAULT SWAPS AND THE LIKE

(76) Inventors: Mukesh Chatter, Concord, MA (US); Rohit Goyal, Cambridge, MA (US); Shiao-bin Soong, Littleton, MA (US)

( * ) Notice: Subject to any disclaimer, the term of this patent is extended or adjusted under 35 U.S.C. 154(b) by 387 days.

(21) Appl. No.: 12/586,858

(22) Filed: Sep. 29, 2009

(65) Prior Publication Data
US 2010/0169126 A1   Jul. 1, 2010

Related U.S. Application Data

(60) Provisional application No. 61/141,124, filed on Dec. 29, 2008.

(51) Int. Cl.
  *G06Q 40/04* (2012.01)
  *G06Q 40/06* (2012.01)
  *G06Q 40/08* (2012.01)

(52) U.S. Cl.
  CPC ............ *G06Q 40/04* (2013.01); *G06Q 40/06* (2013.01); *G06Q 40/08* (2013.01)
  USPC ............................................................ 705/4

(58) Field of Classification Search
  USPC ............................................................ 705/4
  See application file for complete search history.

(56) References Cited

U.S. PATENT DOCUMENTS

| | | | | |
|---|---|---|---|---|
| 7,392,216 B1 * | 6/2008 | Palmgren et al. | ............... | 705/37 |
| 7,657,475 B1 * | 2/2010 | Arpin et al. | .................... | 705/35 |
| 7,752,064 B2 * | 7/2010 | Kauffman | .................... | 705/7.26 |
| 7,778,882 B2 * | 8/2010 | Chatter et al. | ............... | 705/26.3 |
| 7,813,990 B1 * | 10/2010 | Arpin et al. | ................. | 705/36 R |
| 8,103,580 B2 * | 1/2012 | Sato et al. | ........................ | 705/37 |
| 2002/0147674 A1 * | 10/2002 | Gillman | ........................ | 705/37 |
| 2002/0188544 A1 * | 12/2002 | Wizon et al. | ................... | 705/36 |
| 2004/0083156 A1 * | 4/2004 | Schulze | ......................... | 705/37 |
| 2005/0033684 A1 * | 2/2005 | Benedyk et al. | ............... | 705/39 |
| 2005/0097027 A1 * | 5/2005 | Kavanaugh | .................... | 705/37 |
| 2005/0149421 A1 * | 7/2005 | Marlowe-Noren et al. | ..... | 705/35 |
| 2006/0136322 A1 * | 6/2006 | Barry et al. | ..................... | 705/37 |
| 2006/0224483 A1 * | 10/2006 | Samsky et al. | .................. | 705/35 |
| 2007/0208630 A1 * | 9/2007 | Chatter et al. | .................. | 705/26 |
| 2008/0126267 A1 * | 5/2008 | Rosen et al. | ................ | 705/36 R |
| 2009/0171831 A1 * | 7/2009 | Johnson et al. | ................. | 705/37 |

* cited by examiner

*Primary Examiner* — Elda Milef
*Assistant Examiner* — Joan Goodbody
(74) *Attorney, Agent, or Firm* — Clock Tower Law Group; Erik J. Heels; Michael A. Bartley

(57) ABSTRACT

Embodiments of the invention provide an innovative, fully-automated system that facilitates the buying and selling of debt-based derivatives and other assets. The techniques described herein eliminate opaqueness, inefficiencies, and lack of risk monitoring and provide an end-to-end, highly efficient reverse-auction platform that considers many aspects of risk control and other parameters. This is accomplished while computing a true CDS price by incorporating reference entity, primary and secondary insurance company default risks. Furthermore, the reference entity pricing model decouples the borrower from the entity issuing the debt and eliminates rating inflation due to digital discontinuity.

60 Claims, 2 Drawing Sheets

CDS Entity Diagram

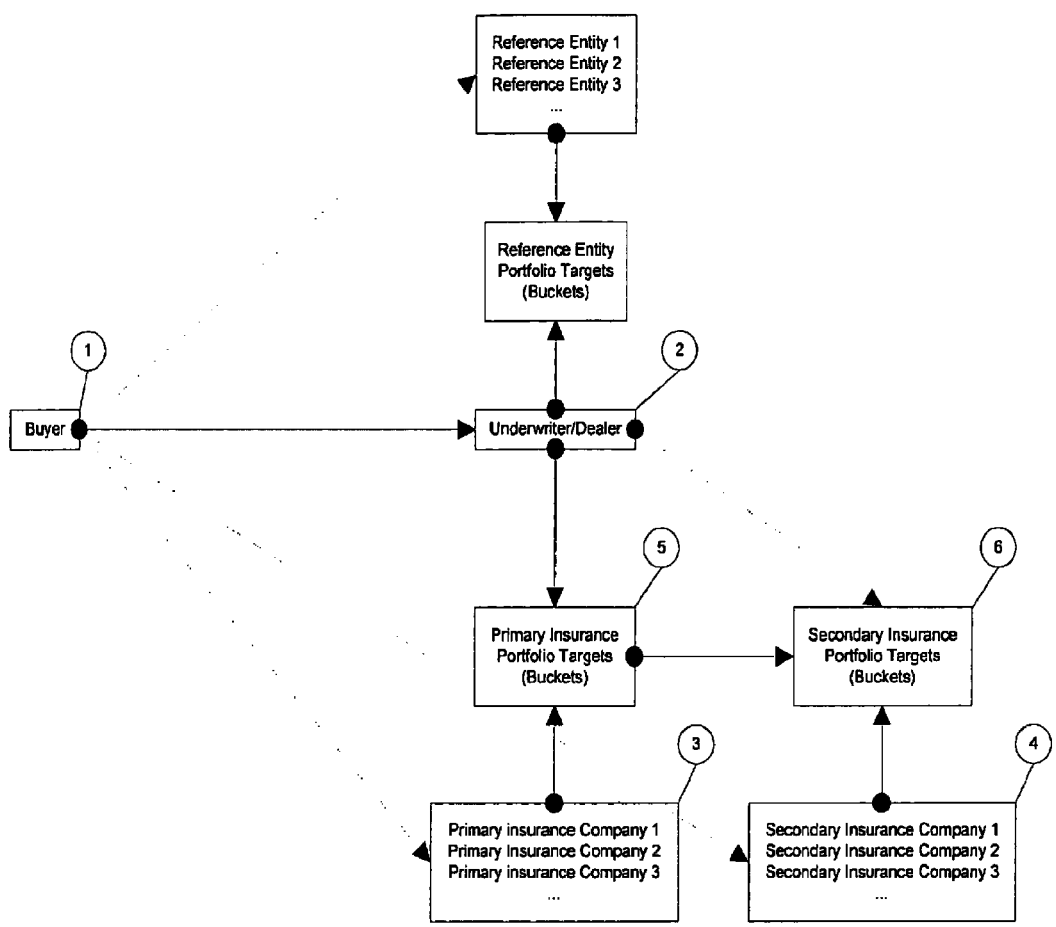
Figure 1: CDS Entity Diagram

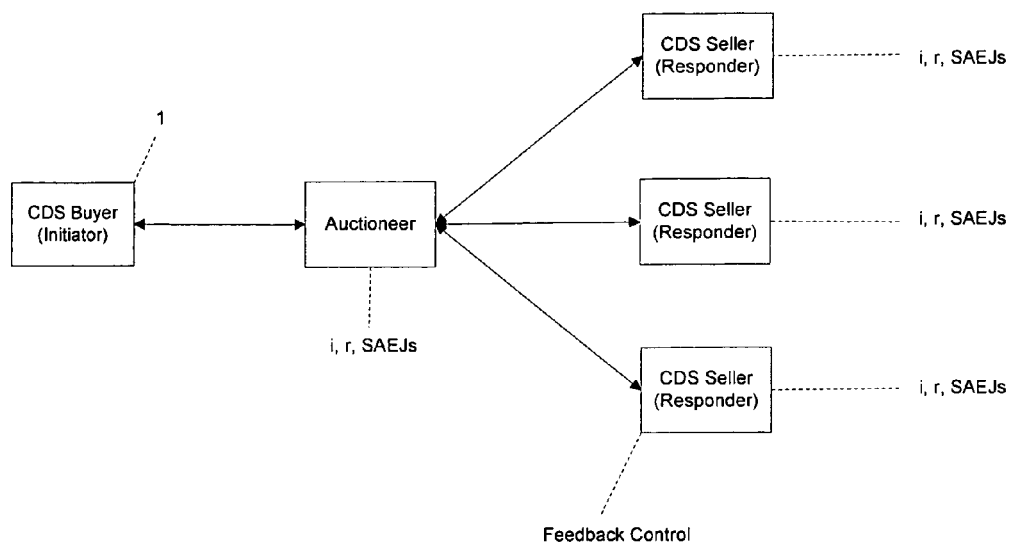
Figure 2 CDS Auction Process

SYSTEMS AND METHODS FOR DETERMINING OPTIMAL PRICING AND RISK CONTROL MONITORING OF AUCTIONED ASSETS INCLUDING THE AUTOMATIC COMPUTATION OF BID PRICES FOR CREDIT DEFAULT SWAPS AND THE LIKE

This application is a utility patent application based upon U.S. Provisional Patent Application 61/141,124, filed Dec. 29, 2008.

FIELD OF THE INVENTION

The present invention relates broadly to the field of web-based e-commerce, including on-line computation for computing bid prices for derivative financial instruments such as credit default swaps (CDS), using various risk and quality factors in the control strategy for auctioning such financial instruments over the Internet; where the term "internet" is used herein to embrace generically all types of public and/or private communication networks employing wireless and/or wired transmission media, and combinations of the above, and also specifically the satellite world wide web. More particularly, the effecting of the price and risk control strategy for auctioned CDS and similar assets in accordance with the invention is specifically involved with the use of novel computer architectures containing automated engines such as the seller automated engines (SAEJ) described in detail in co-pending U.S. patent application Ser. No. 11/367,907 (Publication No. US 2007-0208630 dated Mar. 3, 2006); Ser. No. 11/880,980 (Publication No. US 2009-0030829 dated Jul. 25, 2007) and Ser. No. 11/974,808 (Publication No. US 2009-0099902 dated Oct. 16, 2007), the entire disclosures of which, as stated in the before-mentioned co-pending provisional application, are incorporated herein by reference, and are preferably used in the computers executing the procedures of the present invention, as shown in later-described FIG. 2, though other search engines performing similar functions may be used, as later explained.

While the thrust of said co-pending applications and publications is primarily directed to the on-line auctioning of individual goods and services, the present application is more specifically directed to derivative financial instrument-swapping, often referred to as the before-mentioned credit default swaps (CDS); such frequently being used as a hedge against the potential default of, for example, a mortgage or a debt instrument; (including bonds or secured debts), often bundled together, though often separately owned by different and unrelated entities.

BACKGROUND OF THE INVENTION

Whereas the setup and adjustments of the computer systems, including search engines of said co-pending applications and publications for the holding of on-line live auctions for goods and services, is particularly described therein, the architecture system and set up for bundled financial instruments, including operating a pricing and risk control strategy for internet-auctioned credit default swaps, using various risk and quality factors, is quite different and novel for such auctioning by the automatic computing of such bid prices for credit default swaps and the like. It is thus in order first to examine the unique problems created by such bundled financial instruments as credit default swapping, and as contrasted from individual goods and services.

A credit default swap (CDS) is a derivative financial transaction and instrument that, to the detriment of the current worldwide economy, is often used to hedge against the potential default of an obligor on a debt instrument, such as bonds or secured debts—particularly, mortgages—and specifically where such are bundled together with other unrelated debt instruments of others and used as relatively new types of financial derivative instruments for such potential default hedging.

Typically, there are three primary entities that participate in the creation and bundling of such diverse assets for the buying and selling of a CDS: (1) the underlying entity issuing the debt, (2) the seller of the CDS, and (3) the buyer. The obligor of the debt, sometimes referred to herein as the "reference entity" (see later-described FIG. 1), is the entity for whose debt the coverage is being bought and sold. There may be many types of such reference entities, such as corporations that issue debt directly, entities owning a pool of assets such as a securitized pool of mortgages, credit card debt or auto loans; or in some instances, it may be an index. The "buyer" (typically a hedge fund or a mutual fund) purchases the CDS in the market from sellers, usually as a hedge position against other assets under management. The "seller" (usually an investment bank) acts as the underwriter and dealer and guarantees payments to the buyer should the reference entity default on the debt.

In some instances, the seller purchases insurance from a primary insurer to cover its risk should the reference entity default, or the seller's capital reserve is not sufficient to pay against the demand, or other major market fluctuations. Secondary insurance may also be purchased to further limit the risks of the parties.

The buyer of a CDS is not required to own the underlying bonds of the reference entity. The CDS provides downside protection when markets turn negative as debt default rates for businesses go higher, and the corresponding equity prices drop, and as a result the bond ratings go down. Because the income stream generated by the CDS was based on better market conditions, its value increases, thus offsetting some of the losses.

Since the CDS market is largely over-the-counter (OTC), there is little visibility into the risks associated with the various entities that participate in the market. As such, there is currently no meaningful mechanism to arrive at an accurate market price that reflects the quality of each entity and of the underlying debt instruments, which results in significant pricing inefficiencies.

As an example, a hedge fund may wish to purchase coverage for $10 M of 'AA' rated Ford Motor Company bonds from an underwriter (seller) in the form of a CDS. The seller evaluates the Ford bonds, the various credit agency ratings of the bonds, the status of the company in current market conditions, and the prospects for future growth (or lack thereof)—determining a price, typically using internal, proprietary pricing models. A private transaction is then consummated between the hedge fund and the investment bank having particular timing (typically between three and ten years) and payment terms.

The CDS market is a highly lucrative business whose original intent was to provide entities with a way to hedge against debt default. Over the past decade, the size of the CDS market has multiplied many-fold, resulting in tens of trillions of dollars of notional value for which, however, there is no reserve. To complicate matters, buyers of the CDS instruments cannot accurately quantify their risk exposure when purchasing such instruments, nor is there any structured, repeatable process to accurately discover and validate pricing at the time of purchase or resale. These same risks plague the insurance companies providing the coverage to the underwriter.

Because the terms of CDS transactions are confidential, moreover, none of the buyer, seller or insurance companies has the necessary visibility into each other's aggregated risk positions in order to accurately assess the true value of the CDS. As a result, the margin on an appropriate risk premium is significantly higher.

For example, while certain pricing models are assumed to account for the risks associated with the reference entity (which is not always the case, as explained below), such models do not account for the default risk or the increased risk of failure of the underwriter itself, or those of its insurance companies. Thus, the buyer of the CDS may have accounted for the risk associated with the reference entity, but remains largely exposed to risks associated with the underwriter. To further compound the exposure, default risks associated with the primary and secondary insurance companies are also not factored into the CDS pricing model.

Any catastrophic failure of an underwriter, accordingly, will necessarily result in a loss of coverage for bonds held by the numerous entities who bought the CDS assets as a hedge against the bonds, forcing the sale of the bonds at pennies on the dollar. Furthermore, hedge funds that bought the CDS assets as a potential hedge to protect their position in the underlying security, or as pure speculation, will not be able to collect the gains, causing a panic in the market with disastrous consequences. Such effects are multiplied when the insurer of the risks does not have sufficient reserves, and/or the risks were not appropriately distributed among other insurance companies, resulting in further market collapse.

Another issue that limits the ability of the parties to accurately price CDS assets is so-called "digital discontinuity", and the differences in resolutions of the debt ratings at various stages of the process.

Consider, as an illustration, a pool of mortgage-backed securities comprising mortgages to individuals across the credit score spectrum. Individuals having a credit score below 580 are typically considered sub-prime borrowers; those above a score of 620 are classified as either 'alt A' or 'A Paper' depending upon the quality of the documentation and the ratio of monthly payment to income, and others are classified as "Optional ARM". Using these groupings, mortgages may be categorized into four classes of debt. In practice, this is analogous to using an analog-to-digital (A/D) conversion having a 25% resolution. The mortgage broker or bank and/or other intermediaries then create pools of mortgages having these designations and sell them to investment banks. The investment banks then use the debt-rating agencies and apply another, higher-resolution digitization scheme—effectively using a second-stage, higher bit A/D converter. The investment banks then carefully mix and match assets to create pools such that the new pools barely meet the requirements of a quality rating, taking advantage of the digital discontinuity.

As an example, consider a pool that can barely acquire a rating of 'AA'. Once assigned this rating (and no matter how many sub-prime mortgages are in it), no distinction is made between it and other debt pools that were not deliberately so packaged and are truly 'AA' rated debt. Considering that the original resolution at the origination of a mortgage was much coarser, the refinement of the resolution in the second stage is gated by the first stage resolution. Once the pools are established, the investment banks issue bonds, which in turn may be rated based on the overall credit risk of the bank—again obfuscating the actual quality of the underlying debt. The bond buyer may now purchase a CDS based on the debt, but because the actual quality and risk of the debt pool has been manipulated, the determining of a true price for the CDS is difficult.

Even the existing reference entity default risk pricing models suffer from serious limitations. Although they tend to work well while the borrower and the issuer of the bond are one and the same entity, the accuracy is significantly reduced when that is not the case. For example:

there may be a significant difference between the debt ratings at the origin of the bond in contrast to the current rating of the bond issued by a third party using that debt;

the impact on the overall debt quality is not well understood when asset pools are created for the purposes of securitization and it is very difficult to maintain a consistent quality throughout the pool;

the process of creating the debt pools is not done concurrently with the issuance of the debt, and therefore is sub-optimal;

there is no easy way to update the pool rating if there is deterioration or enhancements in the end borrower's credit quality; and there is no easy way to continuously monitor the quality of the key characteristics of the pool, thus making any meaningful risk monitoring and risk control difficult.

In addition to the difficulties of using conventional reference entity risk modeling techniques to price the CDS instrument, the risks associated with the other market participants are virtually ignored. Thus, there are the following primary factors impacting the CDS price and preventing its accurate measurement:

1. Lack of identification, quantification and monitoring of risks for each of the participants, and requisite controls to manage such risk within an acceptable range;
2. lack of identification and quantification of cross connectivity parameters among the participants and the magnitude of risk each one imparts to its other connected participants;
3. ill-defined means to reflect the collective impact of such risks on the final CDS price; and
4. inability to update the price appropriately as the debt quality of the end borrowers evolve as a function of time.

Taken together, these conditions result in a wide range of disparity in determining a true CDS price, and a lack of any meaningful visibility or control on the part of the market participants to manage the risk, further jeopardizing the validity of the price. This becomes even more troublesome when an existing CDS owner wants to sell a CDS that is "in-the-money"—i.e., it has appreciated in value. Such a purchase requires a cash outlay on the part of the new buyer, thus adding another parameter to the already complicated existing pricing process.

As such, there are numerous questions and concerns that each entity faces when participating in the CDS market, some of which are listed below.

CDS Buyer Limitations and Concerns

Is the CDS priced right?

What is the reference entity valuation methodology?

How does it account for decoupling of end borrower versus the issuer of the bonds or other form of debt?

How are the changes at the lowest level (at borrower's level) reflected up the risk ladder to the CDS on an on-going basis?

What is the time lag from the occurrence of an event at the lowest level (e.g., a mortgage default) to the bonds and subsequently the CDS derived from the mortgage?

How is the integrity of the rating system maintained?
What is the risk of rating inflation and how is it measured?
How accurately is the dealer default risk measured?
How is the dealer default risk accounted for in price?
Is the price being accurately updated in proportion to the underlying debt quality?
How will it be priced if it need be sold when compared to a new CDS if the existing CDS is in-money and hence cash outlay is required on part of the new buyer?
How well is the dealer controlling its own risk?
How much quantitatively measurable risk is dealer taking?
What is the magnitude of insurance coverage in case the dealer defaults?
Is the default risk of primary and secondary insurance accounted for in the price?
What is time-weighted notional value of the aggregated CDS portfolio?
What is the overall CDS portfolio value as a function of time and as function of expense?
What is the ratio of aggregated CDS portfolio value to its corresponding acquisition cost?
What is the ratio of aggregated CDS value to aggregated notional value?
Is the coverage being bought optimum for the existing portfolio?

The makeup of a portfolio of CDS instruments, furthermore, has an impact on the counterparty default risk. For example, each reference entity has a corresponding rating, typically provided by one of the rating agencies; but there is no comprehensive view into the underlying components of the portfolio which is necessary to understand the risks associated with the non-reference entities. If most of the portfolio entities are rated 'CCC', the risk of reference entities default is high, and therefore the risk contribution of the underwriter and any support insurance companies becomes progressively larger. Another fact is that most CDSs have a nominal maturity duration of five years, but once purchased, the duration diminishes over time, impacting its value.

Just as critical, the counterparty risk (i.e., the risks attributed to the underwriter, and by extension primary and secondary Insurance companies) can be higher if their CDS portfolio is weighted towards an industry sector that is under significant market pressure or operating in an adverse market environment. Currently, the process to distribute the purchases to various industry segments or to the segments where large net gains are anticipated is largely manual.

Consider, for example, the situation in which a buyer is heavily concentrated in CDS for mortgage-backed bonds. As these bonds start to default, the payments become due and the burden on the counterparty may become too big to handle, resulting in its default. A manual approach to analyze this risk is not timely, is highly inefficient and is a drain on the resources.

In similar vein, if the CDS instruments attributed to a particular industry sector have a remaining duration, say around one year, then their value as a function of time is likely to reduce faster and they may provide less of an opportunity to trade. If newer CDSs are more expensive (as the sector comes under significant adverse pressure), the burden to replace the existing CDSs increases.

CDS Underwriter

Limitations and Concerns

As with the reference entities of later-discussed FIG. 1, there are a number of factors contributing to the overall risk profile of an underwriter which are also not reflected in conventional CDS pricing models:

The distortion introduced by the digital discontinuities, and lack of visibility into the true risks due to the rating methodologies and their reflection on the underwriter's own rating.
Is the risk well understood at the lowest unit borrower level?
Each dealer has its own methodology to compute the default risk of the reference entity.
The borrower may not be the same entity as the entity issuing the bonds.
Is there a rating inflation?
Is digital discontinuity risk well defined and accounted for in the pricing models?
How is debt default risk updated as a function of time?
Should the capital reserve be adjusted as a function of current risk?
The impact of changing market conditions on the ratings of the reference entities.
Lack of information about the dollar-weighted average maturity duration of the portfolio.
What is the visibility depth and granularity with respect to the underlying debt obligations? For example, if the underlying assets have variable interest rates potentially impacting the debt quality in more significant manner, how does it affect the overall debt quality?
How is valuation change at the unit level of the underlying asset reflected at the CDS pricing level?
How is the asset pool constructed?
As various parameters move, how does it affect the capital reserve requirements?
What is the ratio of capital reserve to notional value?
What is the ratio of already-written CDS value to the corresponding notional value?
What is the ratio of income generated over a time frame versus the corresponding aggregated notional value underwritten?
How is the risk exposure defined and controlled?
What is the relationship between the aggregated income generation versus the risk exposure?
How accurate is this information?
Is it constant or evolving?
How is it controlled, if possible?
What is the accurate ratio of aggregated CDS value underwritten at inception to their current aggregated value?
Is there a diversification in terms of industry sector?
What is the magnitude of liquidity or how liquid are the reserve capital assets?
What is the next level of protection if the underwriter's reserve capital turns out to be insufficient?
What is the viability of the primary and secondary insurance companies and their reserves?

Primary Insurance

Limitations and Concerns

There are also a number of factors contributing to the overall risk profile of the insurers of the CDS pools, which are not reflected in conventional CDS pricing models. For example:
The insurance company's own rating
The insurance companies capital reserves, as statutory reserve requirements do not apply to coverage of CDSs.

Where the insurance company has invested the premiums, and the degree of overlap with the industry sectors issuing the debt.

Liquidity of the insurance company's capital reserve.

How the insurance company's ratings are affected by a downward revision of the underwriter's financial position?

How are the payoff risks allocated among secondary insurance companies?

What is the ratio of premiums collected versus the notional coverage underwritten?

What is the ratio of default risk to notional value coverage?

How much capital reserve compared to the notional value insured is maintained by the secondary insurance company in case the primary defaults? Is this sufficient?

How are the reserves invested and what kind of steps has the secondary insurance company taken to not walk in trouble lock-step with the underwriter and primary insurance company?

What is the overlap between a secondary insurer and multiple primary insurers?

OBJECTS OF INVENTION

An object of the present invention, therefore, is to provide a new and improved system and apparatus and procedure and method for automatically determining a pricing and risk control strategy operable in real time for on-line auction assets, more specifically, of derivative financial instruments and the like requiring the computation of bid prices as for credit default swaps (CDS), using predetermined risk and quality factors.

A further object is to provide such a novel pricing and risk control strategy for derivative financial instruments generally that are used to hedge against the potential default of an obligor on a debt instrument, such as bonds, or secured debts, such as mortgages.

Still a further object of the invention is to provide an innovative and fully automated system that facilitates the buying and selling of debt-based and other assets that avoids the before-described present day opaqueness and inefficiencies and lack of risk management; providing, instead, an efficient customer reverse auction platform that takes into account many of the above-discussed aspects of risk control, while computing a true CDS price by incorporating the requirements of the derivative buyer and any primary and secondary parties that provide insurance of default risk.

Still another object is to provide such a novel system wherein the pricing model de-couples the borrower from the entity issuing the derivative, through eliminating the inflation of the rating of the instrument due to digital discontinuities.

An additional object of the embodiments of the invention is to provide CDS market participants with a novel transparent and automatic technique for creating a securitized pool of assets (later more fully defined) wherein a reverse auction process is used to discover in real time the true CDS price in the market among the various participants and fully automated risk control mechanism maintains dealer risk within a specified range and with full visibility provided subsequent to the transaction to enable any changes at the borrower level to be accounted for and reflected in the current CDS pricing. Given the complex interdependencies and cross coupling of many variables associated with the entities involved, another objective of the invention is to enhance the accuracy of a reference entity valuation model and true price discovery, herein defined, along with providing clear visibility into the existing debt quality in real-time, subsequent to the transaction.

Another object is to facilitate the identification and quantification of each variable for each of the entities and their covariance and to assess the relative magnitude of impact of each such connection on the other entities and an overall risk measurement and analysis, while simultaneously eliminating or substantially minimizing the impact of digitization and ratings creep-up. As a result, overall risk profiles are quantified and compared to acceptable risk exposure bounds uniquely specified by each entity which permits the derivation of a true CDS price and the construction of securitized pools by pro-actively controlling and optimizing the acquisition of the assets in a manner consistent with the requirements of the bond issuers further up in the chain.

Other and further objects will be explained hereinafter and are more particularly delineated in the appended claims.

SUMMARY OF INVENTION

In summary, from perhaps the most generalized aspects of the invention in determining a pricing and risk control strategy for auctioned assets such as credit default swap instruments, using various risk and quality factors, the invention provides an innovative, fully-automated system that facilitates the buying and selling of such debt-based derivatives and other assets. The techniques described herein eliminate prior opaqueness, inefficiencies, and lack of risk monitoring, and provide an end-to-end, highly efficient reverse-auction platform that considers many aspects of risk control and other parameters. This is accomplished while computing a true CDS price by incorporating reference entity, primary and secondary insurance company default risks. Furthermore, the reference entity pricing model decouples the borrower from the entity issuing the debt and eliminates rating inflation due to digital discontinuity in the market.

Preferred techniques and best modes for practicing the invention are hereinafter described.

DRAWINGS

The invention will now be described in connection with the accompanying drawings, FIG. 1 of which is an entity diagram suited for over-the-counter (OTC) operation heretofore providing little visibility into the risks associated with the various entities participating in the market; and FIG. 2 is a block diagram of a CDS automatic real time auction process in accordance with the present invention, incorporating the previously mentioned SAEJ automatic engines of the earlier cited patent applications and publications, disclosures of which, as before stated in said provisional application, are deemed to be incorporated herein by reference.

INTRODUCTION TO DESCRIPTION OF INVENTION

As is evident, this invention involves a multi-source, interdependent, multi staged, multi variable problem in which each stage contributes its own uncertainties. These, moreover, are then further attenuated and/or amplified as they progress through the stages. As described above, the problems underlining the invention are compounded by the digital nature of the ratings and the resulting discontinuities which give rise to a higher band of uncertainties. It also makes the process highly susceptible to manipulation, as pools that barely meet the standards for an AA rating, may have very different profiles, that are today treated the same as those that are actually at the top of the AA rating tier.

Considering that the CDS and other similar instruments have now become key components of the global financial infrastructure, this lack of transparency and ability to meaningfully quantify the risk inherent in such instruments has created an intense urgency to address this problem.

It may be first in order to define terms that are used throughout the description of the invention and its improvement in operation over the prior art.

DESCRIPTION OF PREFERRED EMBODIMENT(S) OF THE INVENTION

As before explained, the CDS entity diagram of FIG. 1 illustrates a buyer 1 operating through an underwriter/dealer 2, interfacing with a number of reference entities (shown as three) through reference entity portfolio targets (buckets for). Similarly, primary and secondary insurance companies, shown as 3 and 4 interface at their respective portfolio targets 5 and 6. As before described, FIG. 2 illustrates the auction process in accordance with the invention, later more fully described.

It is first in order to explain how the present invention improves upon current referenced entity pricing models.

When a borrower, (mortgage or other debt instrument) is considered for addition to the pool, it is pre-screened to determine whether it meets the criteria for that pool. For example, using the criteria above, if the borrowed amount is above $1 M, it is rejected from consideration. If, however, a borrower has a credit score higher than 570 and meets the remaining screening criteria, its debt is evaluated in the context of optimized objectives. The optimization algorithms synergistically move the average numbers in a direction to match the objectives as laid out in advance. Thus, the pool building process is done using a "Correct by Construction" methodology instead of an existing trial and error methodology.

An alternative embodiment of this invention improves the above by having the seller of the assets, [for example, mortgage brokers or banks] initiate an auction in which those constructing the pool participate and compete with each other to acquire the assets. Each participant provides one or more pre-screening criteria based on its own unique objectives and computes a bid amount to acquire the asset. At the completion of the auction, the entity providing the best bid "wins" the auction and purchases the asset for its pool. This real-time, iterative auction, as explained in said publications, ensures that true price discovery occurs. Coupled with real-time optimization of pool construction by each buyer, this technique ensures that the pools are created in a transparent manner and based on the entities criteria, while avoiding rating inflation. As the buyers (typically investment banks) of such clean and transparent securitized pools with unambiguous rating issue bonds against such pools, it will create further confidence for the buyer of the bond and for the dealer underwriting CDS, thus creating an end-to-end seamless, and transparent process free of artificial distortions. Furthermore, as the debt quality evolves over time, the risk profile of the pool can be updated for each such change at the underlying asset, and the quality deterioration or enhancement can be measured. As an example, if the credit score of the borrower deteriorates from 790 to 530, such an event is reflected in the aggregated debt quality immediately, as are any changes in the valuations of the underlying assets. Thus, the debt default rate is updated as the market conditions change.

DEFINITION OF TERMS

Initiator: An 'initiator' is the entity requesting an auction for whose benefit others compete. The initiator may be a buyer or a seller depending on the function being performed. For example, if a fund is purchasing a new CDS from a dealer, then the initiator is the buyer of the CDS. Alternately, if a fund wishes to sell an existing CDS, the seller is the initiator.

Responder: A 'responder' is an entity responding to the request from an initiator and competing with other responders. Using the example above, a dealer responding to the request from a fund to purchase a CDS acts as a responder, and is also a seller of the coverage. On the other hand, when a hedge fund wants to sell an existing CDS and a dealer competes with others to buy it, the dealers act as responders in the capacity of a buyer.

SAEJ: Seller automated engines, as described in earlier mentioned co-pending U.S. patent application Ser. Nos. 11/367,907, 11/880,980 and 11/974,808, and their respective publications, the entire disclosures of which are incorporated herein by reference.

iSAEJ: Initiator's SAEJ or SAEJ working as an 'Initiator'
rSAEJ: Responder's SAEJ or SAEJ working as 'Responder'

Diversification index: A measurement of the diversification of the assets within a certain asset pool ranging from 1 to 10, 1 being the highest concentration of assets and 10 being the highest diversification of assets. As an example, if no more than 10% of the dollar-weighted assets are invested in any industry sector, the diversification index is 10. On the other hand, if 50% of the assets are in one sector, its index is 5.

The ideal diversification is to invest amount $A_i^T$ to sector i. For an arbitrary allocation, the "distance" to the ideal allocation is:

$$d = \sqrt{\sum_{i=1}^{N} \frac{A_i}{A}\left(\frac{A_i - A_i^T}{A_i^T}\right)^2} \qquad (1)$$

A distance of zero means perfect diversification, and a distance of 1 means full concentration on one sector. Thus the diversification index can be defined as $$D = k(1-d), \qquad (2)$$

where k is used as a scaling factor.

Liquidity Index: A measurement of how quickly an entity has access to capital. The liquidity index ranges from 1 to 10, one being least liquid and 10 being the highest liquidity.

[As an example, the capital reserve of a primary insurance company may use the following liquidity ratings for different classes of assets:

| Type of Deployment | Liquidity Rating |
| --- | --- |
| 24 hours or less/money market | 10 |
| Short-term government treasuries | 9 |
| Domestic equity | 8 |
| 7 day commercial paper | 7 |
| 28 days money market | 6 |
| Foreign equity | 5 |

-continued

| Type of Deployment | Liquidity Rating |
|---|---|
| 3-Month cash enhancement products | 4 |
| 6-Month cash enhancement products | 3 |
| Private Equity | 2 |
| Venture Capital | 1 |

To compute a dollar-weighted average of liquidity rating to compute the liquidity index when all the assets are not in just one class, the following formula may be used:

$$L = \sum_i \frac{A_i L_i}{A}, \quad (3)$$

where A is the total asset, $A_i$ is the asset invested in asset class i and $L_i$ is the liquidity rating for class i.

There can be more nuanced variations of this definition. For example, if $L_i$ is the liquidity duration of the asset class i, L can be interpreted as the dollar-weighted average liquidity duration.]

As a first step towards creating a transparent process not subject to current or prior art inadvertent or deliberate rating creep-ups, embodiments of the invention use a consistent, analog rating system having a much higher resolution than the current conventional digital approaches. Further, risks are classified as either linear or non-linear, and accounted for accordingly.

Even in instances in which the digital rating techniques are used, the disclosed techniques can use non-linear true default rates based on dollar-weighted average to assess the asset pool.

The asset pool is created using a set of parameters which are used to pre-screen each asset. For example, a pool may be created using the following parameters:

| | |
|---|---|
| Minimum acceptable credit core | 570 |
| Maximum borrowed amount | $1 M |
| Minimum borrowed amount | $150,000 |
| Dollar-weighted average credit core | 768 |
| Dollar-weighted average default risk | 3% |
| Average dollar-weighted debt to income ratio | 1:3.5 |
| Dollar-weighted average interest rate | 6.3% |
| Dollar-weighted average maturity duration | 17 years |
| Size of the pool | $100 M |

The following are examples of current parameters and targets used by buyers to identify and quantify risk and pricing associated with CDSs, the underlying debt, and the other entities in the market. In some prior implementations, entities may use the risk monitoring and control techniques described below as an input into the pricing strategies as part of a market-wide auction, whereas in other cases such methodologies may be implemented independently and used solely to quantify the risk exposure of an individual entity.

Current Status
  Dollar-weighted average rating of the reference entities for which CDS already owned
  Current dollar-weighted aggregated remaining maturity duration
  The diversification index of CDS already owned
    Industry sector by sector weight
  The dollar-weighted aggregated remaining maturity duration on a sector by sector basis for the CDS already owned
  The dollar-weighted aggregated reference entities ratings on a sector by sector basis for the CDS already owned
  Time weighted aggregated notional value outstanding
  In-money value of each CDS at any instance in time
  Aggregated in-money value at any instance in time
  Ratio of aggregated purchasing cost to aggregated notional value
  Ratio of aggregated purchasing cost to aggregated in-money value
  Ratio of aggregated present CDS value to aggregated notional value
    As this number goes higher, the CDS owner may want to cash out a part of it to maintain it at a pre-defined level.

Targets
  Desired dollar-weighted average rating of the reference entities
  Desired dollar-weighted aggregated maturity duration objective
  The desired diversification index by industry and/or seller
  Desired dollar-weighted aggregated maturity duration on a sector by sector basis for the CDS already owned
  Desired dollar-weighted aggregated reference entities ratings on a sector by sector basis for the CDS already owned
  Desired time-weighted aggregated notional value
  Maximum allowed aggregated in-money value at any instance in time
  Maximum allowed ratio of aggregated purchasing cost to aggregated notional value
  Maximum allowed ratio of aggregated purchasing cost to aggregated in-money value
  Maximum allowed ratio of aggregated present CDS value to aggregated notional value The following are examples of current parameters and targets used by underwriters to identify and quantify risk and pricing associated with CDSs, the underlying debt, and the other entities in the market.

Present Status (e.g., the Existing Portfolio)
  Underwriter's own rating as per the rating agency
  Ratio of capital reserve to notional value underwritten
  If reference entities are sub-classified in separate buckets according to their respective ratings, then the ratio of capital reserve to the notional value of that category in which reference entity under consideration resides
  Ratio of capital reserve to notional value of those entities rated a notch above default
  Dollar-weighted aggregated average default rate associated with the reference entities at the origin of issuance
  Ratio of aggregated value of the CDS at issuance to the corresponding aggregated notional value
  Ratio of dollar-weighted average default rate of the reference entities to current capital reserve
  Ratio of present aggregated market value of CDS to their corresponding notional value
  Dollar-weighted average rating of the of the reference entities underwritten for CDS
    The dollar-weighted average rating difference between the reference entity and the borrower at the origin of issuance.
  The aggregated value of the underlying assets at the origin of issuance
  The dollar-weighted average maturity duration of the CDS portfolio
  Current dollar-weighted average rating of each sector
  Diversification index of reserve
  Diversification index by industry sector in case one of the sectors came under stress Liquidation index of the reserve
Rating of each of the primary insurance
Primary insurance diversification
Dollar-weighted average rating of all the primary insurance companies taken together
Rating of each of the secondary insurance
Dollar-weighted average rating of all the secondary insurance companies taken together
Secondary insurance diversification Targets
  Minimum guaranteed underwriter rating
  Minimum guaranteed ratio of capital reserve to notional value underwritten
  If reference entities are sub-classified in separate buckets according to their respective ratings, then the minimum guaranteed ratio of capital reserve to their notional value for the category the reference entity under consideration falls
  Minimum guaranteed ratio of capital reserve to notional value of those entities rated a notch above default
  Worst case dollar-weighted average default rates associated with the reference entities
  Minimum requisite dollar-weighted average rating of the debt at the origin of issuance
  Maximum permissible dollar-weighted average rating difference between the reference entities and their corresponding borrowers at the origin of debt issuance
  Minimum guaranteed dollar-weighted average rating of the aggregated pool of the reference entities underwritten for CDS
  Minimum guaranteed dollar-weighted average rating of each sector
  Minimum guaranteed diversification index
  Minimum guaranteed diversification index by industry sector in case one of the sectors came under stress
  Minimum guaranteed liquidation index of the reserve
    Such as Money Market, able to liquidate in 30 days etc. or more likely a blended value, using the definition above, it could 8
  Minimum primary insurance diversification
    Maximum permissible percentage provided by any single insurance company such as no one to provide more than 20% of the coverage
  Minimum secondary insurance diversification
    Maximum permissible percentage provided by any single insurance company such as no one to provide more than 25% of the coverage
  Minimum guaranteed rating of each of the primary insurance
  Minimum dollar-weighted average rating of all the primary insurance companies taken together
  Minimum guaranteed rating of the secondary insurance
  Minimum dollar-weighted average rating of all the secondary insurance companies taken together The following are examples of current parameters and targets used by insurers (primary and secondary) to identify and quantify risk and pricing associated with CDSs, the underlying debt, and the other entities in the market.

Present Pool Status
  Insurance company's own rating
  Ratio of capital reserve versus the notional value insured
  Diversification index of reserves
  Liquidity index of reserves
  Current rating of the underwriter under consideration
  Dollar-weighted average default rates of the underwriter
  Dollar-weighted average rating of all the underwriters combined together
  Diversification of underwriters
  Highest concentration of notional value in any single insurance company Targets/Constraints
  Minimum guaranteed rating of the insurer
  Minimum guaranteed Ratio of Capital Reserve versus the Notional Value insured
  Minimum rating required of each underwriter
  Minimum dollar-weighted average rating required of all the underwriters combined together
  Diversification of underwriters
  Dollar-weighted average default rates of the underwriter
  Diversification of capital reserve
  Liquidation index of capital reserve
  Maximum notional value supported by a single secondary insurance company Risk Monitoring and Optimized Risk Control To assist in determining the appropriate pricing and risk allocation, certain statistics are calculated, in accordance with the invention, based on the underlying debt, assets in the pool, and characteristics of the entities themselves. The following are examples of current parameters and targets used by insurers (primary and secondary) to identify and quantify risk and pricing associated with CDSs, the underlying debt, and the other entities in the market. Examples of these statistics include:

$$RequisiteCapitalReserve = (AverageDefaultRisk * NotionalValue)$$

Differential Risk Exposure, which can be defined in more than one way, including:

$$DifferentialRiskExposure = k_1(CurrentMarketValue - ValueAtOrigin)/NotionalValue$$

$$DifferentialRiskExposure = k_2(CurrentAverageDefaultRisk - DefaultRiskAtOrigin)$$

$$DifferentialRiskExposure = k_3(AssetValueAtOrigin - CurrentAssetValue)/NotionalValue$$

where $k_1$, $k_2$ and/or $k_3$ may be constants, linear, or non-linear functions to account for additional influences or to attenuate/enhance any non-linear effects. From a risk monitoring perspective, if this number is positive, it indicates an increased risk trend, with the value identifying the magnitude of such risk. If this number is negative, the risk exposure is decreasing. Corresponding to each of the above definitions, "Capital Sufficiency Index" can be defined as follows:

$$CapitalSufficiencyIndex = k(DifferentialRiskExposure)/(ExistingCapitalReserve/NotionalValue)$$

"Average Default Risk" is a dealer's own view of the risks associated with the reference entity whereas the "Current Market Value" may be a better indicator of the market sentiments. Similarly, "Current Asset Value" may be unique to the dealer; however, the "Current Market Value" is a broader index of the market sentiment. Any difference between these may indicate certain limitations of the dealer's own methodologies or an early indicator of future market conditions. In addition to using a dollar-weighted average, the mean or mode may also be used. Similar calculations may also be performed on sector by sector basis.

For securitized pools, the Differential Risk Exposure may also be evaluated as:

$$DifferentialRiskExposure = k(CurrentAverageCreditScore - AverageCreditScoreAtOrigin)/NotionalValue$$

There could also be other parameters depending on the context; these are shown for exemplary purposes only.

The objective of the dealer is to quantitatively define the risk exposure unique to its own business model and dynamically optimize its activities in the market to maintain a consistent (or managed) risk exposure within acceptable parameters. Thus the real-time optimized risk control can be accomplished using the following techniques:

Assume that the capital reserve amount is fixed in absolute dollar terms, based on the absolute amount and the corresponding known notional value in advance, derive an acceptable average default risk. CDSs are then issued such that the average default risk is maintained until the capital reserve bucket has been filled. Once the capital reserve bucket has been filled, the asset values and/or market prices are monitored using the capital sufficiency index to keep the capital reserve amount constant. This may be accomplished by purchasing additional coverage insurance from primary and/or secondary insurance companies, covering the additional exposure by hedging on the other side of the trade, and/or selling some of the existing CDS in the open market to keep the risk within acceptable range.

If the average default risk goes down from that origin of CDS, then the Dealer can increase the Notional Value ceiling and underwrite more CDS or redeploy that surplus capital somewhere else.

In instances in which the capital reserve is fixed as percentage, the optimization process ensures that the requisite capital reserve is maintained, and, as the notional value increases, the capital reserve is added. Alternatively, additional CDSs could be written with an average default risk such that the ratio is maintained. If the ratio decreases then the additional CDS can be sold with somewhat higher risk, and in return receive higher premium.

Another element of the risk control is sector allocation. A dealer can reduce its risk using diversification such that various percentages of its asset pool are assigned to different sectors. As an example, assume the following target asset diversification:

| Technology | 15% |
|---|---|
| Industrial | 8% |
| Mortgage | 12% |
| Pharmaceutical | 16% |
| Utilities | 10% |
| Energy | 17% |
| Finance | 18% |
| Consumer Cyclical | 4% |

The Auction Process of FIG. 2

When a CDS request is received by the dealer, the SAEJ engine, FIG. 2, determines the sector the request is associated with. The determination of whether to accept or not to accept the CDS into the asset pool is based on maintaining the relative ratio among the various sectors so that any dramatic decline in one does not severely distress the entire portfolio.

The baseline premium for the reference entity is computed and modulated based on many factors including the dealer's default risk, coverage and rating quality of the primary and secondary insurances, magnitude of reserve capital diversification, sector diversification, competitive market pricing at that instance in time, dealer's status versus its own unique targets, the time left to meet the targets, and so on.

One aspect of the invention provides an on-line market place in which CDS buyers, sellers and support entities such as the primary and secondary insurance companies participate in real-time auctions as described in said co-pending application publications. Comprehensive pricing models encompassing various risk parameters associated with the market participants are built and an optimum price is calculated. Initially, the risks associated with each of the reference entities is modeled by the underwriter using its pricing models.

As an example, a CDS buyer can initiate a real-time on-demand, 24×7, auction with a well defined and quantified request to an 'Auctioneer', as shown in FIG. 2. The auctioneer then transmits the request to a network of participating CDS responders. A pre-configured SAEJ at each responder evaluates the request in the context of its own business objectives and current status, computes a bid using the price optimization techniques defined below, and responds in real-time with a bid.

The auctioneer then examines the bids so received, finds the best bid, and sends it back to each of the responders to see if anyone can beat the best value offered so far. Each responder SAEJ evaluates the best bid received in the first round, re-computes its bid, and determines if it can beat such price. If so, the SAEJ re-submits its bid, each one being progressively lower than the previous one, with the winner of the last round not needing to (but may) re-submit. Those responders which cannot beat the best bid offered in the previous round drop out of the auction. This iterative and competitive process is repeated in real-time until only one responder is left. That responder is then declared the winner and a transaction is initiated between the initiator and the winning responder. In case of a tie, there are multiple ways to resolve it including a random number generator. The process may be conducted asynchronously or in real-time.

In some cases, only those responders who meet the minimum price requirements (pre-screen) as set by the initiator are allowed to participate. In other cases, all responders participate regardless of whether they meet the pre-screen as requested by the initiator or not, because some may be close enough to the pre-screen criteria and be acceptable to the initiator if its price is much better.

In other instances, a holder of a CDS may decide to sell it. In this case, the CDS owner is an 'Initiator', and the buyers may be entities that own additional such instruments, or they may be the original dealer providing the protection. Such prospective buyers act as the responders in this case. A similar process is adopted as described above and the true market price of the underlying CDS instrument (derivative) is discovered and determined (determination is consummation of transaction versus discovery where the there is only a single responder left with the highest bid).

Additional features of this process are described below. A SAEJ at the Initiator (also referred as iSAEJ) acts as an active participant in the process based on various market approaches. Each such approach outlined below considers the variables described above, and performs an optimum price discovery in conjunction with appropriate risk control.

In this scenario, the reference parameters noted below are specified by the initiator to the auctioneer for subsequent communication to the underwriters (responders) at the auction request:

Name of the reference entity
Required CDS duration
The dollar amount of purchase/Number of units desired
List of Sellers to exclude
The list of Reference parameters as outlined under earlier, or a desired subset related to the Underwriter, Primary Insurance Company, and Secondary Insurance Company, but not their values Each responder SAEJ (rSAEJ) evaluates the request and places a bid for the price as per the criterion established. The evaluation and subsequent decision to participate in the auction and the price the responder is willing to pay is a function of one's own unique goals in the context of risk control and profit optimization. To keep risk within the acceptable range as uniquely defined by its dealer, each rSAEJ computes the bids based on its current status and the distance to its targets based on the following parameters:

(Aggregated Premium Collected/Aggregated Notional Value)
(Requisite Capital Reserve)
(Dollar-weighted Average Rating)
(Dollar-weighted Average Default Risk)
(Market Value of CDS Underwritten So Far—Aggregated Premium Collected)/(Aggregated Notional Value)
(Dollar-weighted Average CDS Maturity Duration)
(Dollar-weighted average Primary Insurance Companies Rating)
(Coverage distribution among Primary Insurance Companies)
(Coverage distribution among Secondary Insurance Companies)
(Dollar-weighted average Secondary Insurance Companies Rating)
(Aggregated Notional Value as a Target)
If there are Securitized Pools underneath, then optimize:
(Dollar-weighted Average Credit Score)/(Corresponding Aggregated Notional Value)
(Aggregated Asset Value/Corresponding Aggregated Notional Value)
(Aggregated Debt of the Borrowers/Corresponding Aggregated Income of the Borrowers)

A dealer may further enhance this system by implementing different sub-strategies within overall strategy. As an example, a dealer may be willing to have higher short-term default risk but a lower long-term default risk. Another example is sub-categorization by the default risk such as 'Dollar-weighted average of those Reference Entities who are a notch above the default' to the 'Capital Reserve'; or 'Dollar-weighted average of those Reference Entities who are a notch above the default' to the 'Aggregated Notional Value.'

The best bid received by the auctioneer is sent back to each rSAEJ and the next round of bidding starts in which either a participant beats the previous best bid or exits the auction. The process is repeated until there is only one bid left. In case of a tie, winner can be picked-up either using random number generator or variations thereof. The final results are provided to the buyer arranged in the order by best price. Each price is also coupled with additional information for the reference parameters included in the buyer's request. Another alternative for the underwriters is to provide remaining parameters beyond what was requested, such as those not used during or that have changed since the previous round(s); and may include both current and target numbers.

Once the buyer has determined their optimal pricing for the asset, the initiator can either choose to ignore all the parameter details above and make a decision to sell the asset based solely on the best price or select certain parameters and compute additional metrics to determine how to proceed. For example, if more than one parameter is selected then the 'iSAEJ' computes the distance between the desired values for various reference parameters and the target values provided by each responder. In some instances, the parameters may be weighted to give preference to certain parameters over others. The lower the difference between the desired value and the value provided by the responder the closer it is to the desired goal. In an ideal case the distance is zero for each variable. However, this distance has to be seen in the context of the quoted price from responders. Consider, for example, a price quoted by an underwriter of 2%/year, assuming the initiator is concerned with only one variable and the distance from ideal is normalized distance of '1'. A second underwriter quotes a price of 1%, however, its distance from the ideal is '1.1'. In this case from the Initiator's perspective, the second alternative is superior than the first one.

Thus, a "Coverage Quality Efficiency" (CQE) can be computed by first calculating the normalized actual distance from the target values using the following formula:

$$d = \sqrt{\sum_i w_i \left(\frac{r_i - R_i^T}{R_i^M}\right)^2} \qquad (4)$$

where the index i denotes reference parameter i, $r_i$ is the bidder's reference parameter value, and $w_i$ is the weight the buyer assigns to reference parameter i; $R_i^T$ is the buyer's reference parameter target, and $R_i^M$ is the maximum possible distance to target. Here the maximum distance possible from target indicates the lowest possible match; for example, if the lowest rating is 'CCC' and the highest is AAA, then the maximum distance possible could be '6' (B, BB, BBB, A, AA). The CQE is then calculated as:

$$q = 1 - \frac{p}{1-d}. \qquad (5)$$

Using the example above, the CQE of the first underwriter is 1−0.02/(1−1/6)=0.976. For second underwriter, it is 1−0.01/(1−1.1/6)=0.988. Using this approach, the second underwriter is accepted as the winner and it is notified via the auctioneer. If there is more than one variable under consideration, the 'CQE' may be computed by squaring the unique absolute distance for each variable and multiplying it by the square of its weight. Each computed CQE is then summed and the square root is taken, thus determining the normalized distance.

The actual distance from to overall target is then computed using the constraints, which are assumed to be less than or equal to the desired value. In situations in which the reference parameters are better than expected, a distance (penalty) is still calculated. In these situations, the distance formula is modified to:

$$d = \sum_i w_i \left(\frac{R_i^T - r_i}{R_i^M}\right) \qquad (6)$$

such that the distance becomes negative when the reference parameter value is better (higher) than the target, and the smallest distance is −1 and the biggest distance is still 1.

Various options are then available.

TABLE I

(Options 1-5)

Option 1

This tells every company to set up targets for its capital reserve -- how much risk is it willing to take -- what is the average rating of the debt already written-how much risk is a company to take -- and everything is evaluated and decided in this context.

Before the present invention, risk control, as distinguished from risk monitoring, was totally absent i.e. zero. There was not even suitable risk monitoring let alone control. The present invention introduces active control using appropriate mathematics with the automatic engine system of the type disclosed said prior applications and publications. It is a control system with feedback on a dynamic face in forming where every transaction is so that the company keeps in the middle, so to speak, given the capital reserve system and the method for optimizing quantitive business objectives and targets of product and seller services together with the synchronizing of product promotions and advertising. These may include one or more search engines, as described in said publications based on Internet research.

Option 2

The second processing option is similar to Option 1, above, and introduces the following modifications:
the iSAEJ' provides its evaluation criterion (including the unique weight assigned to each parameter) to the auctioneer which shares it with each Underwriter's 'rSAEJ';
Each rSAEJ pre-screens the request based on its own business objectives and distance to the target;
assuming the asset passes pre-screening, each rSAEJ' computes the CQE and places the bids;
the underwriter now knows how much he needs to drop his price to win the bid as the lowest price bid in this instance may not necessarily win if it has relatively higher distance from what is desired. In essence, the bid made by the underwriter is more informed as the price discovery process is iterative;
In an alternative scenario, both price and CQE are sent as part of the bid and the auctioneer picks two winners, one for price and another for CQE, and the iSAEJ evaluates each bid.

Option 3

A third option is similar to Options 1 and 2 in that the iSAEJ provides the requisite information about the reference entity and the desired attributes of the requisite parameters, however there are certain variations. For example, a buyer may not provide the name of the reference entity and instead specifies a sector, and the responder selects the reference entity within the sector. In such cases, each participating underwriter maintains multiple parameter "buckets" into which each asset will be placed. As an example, an underwriter may maintain ratings buckets and sub-buckets, each containing the relative value of the variances for that specific parameter. More specifically, an underwriter may have multiple insurance companies (primary insurance) in one bucket, each rated differently. Each sub-bucket then contains the specific ratings and corresponding characteristics of the parameters related to that insurance company.

***

[[Another example of how to assign assets to buckets is to use the relative portfolio size of each reference entity ratings is kept along with corresponding minimum pool reserve. An underwriter may have $10 B worth of notional value for 'AAA' rated reference entities, and guarantees a minimum reserve capital of $500 M against it, resulting in a 5% reserve capital. On the other hand, for 'CCC' rated reference entities, the underwriter provides coverage for $100 B worth of notional value but only 6% minimum guaranteed reserve ratio, although the proportionate risk is much higher. A minimum guaranteed reserve implies certain additional collateral to the initiator if the reserve ratio falls below that threshold. As reference entity ratings evolve, the CDSs are reclassified, and the buckets adjusted.

Once the parameters are received by the underwriter's 'rSAEJ' via the auctioneer, each 'rSAEJ' creates a customized response to the extent permissible by its own constraints. Consider an example in which a buyer specifies the requirements as outlined in Option 1 or 2, but in addition it provides the following parameters:

| | |
|---|---|
| Name of the Reference Entity and current rating: | IBM, AA |
| Notional Value | $10 M |
| Minimum Dealer Rating | AA |
| Duration | 5 years |
| Minimum Capital Reserve Ratio for the corresponding rating bucket | 4% |
| Minimum Primary Insurance Rating | AA |
| Minimum Primary Insurance Capital Reserve Ratio | 3% |
| Minimum Secondary Insurance rating | A |
| Minimum Secondary Insurance Capital Reserve ratio | 1% |
| Current dollar-weighted average default rating of the reference entity sub-category | 2 or below |

TABLE I-continued

(Options 1-5)

| | |
|---|---|
| Diversification Index of Reserves for AAA rated Reference entities bucket | 8 or better |
| Liquidity index of Reserves for AAA rated Reference entities bucket | 5 or better |
| Aggregated CDS value outstanding--- than Capital Reserve | |

Given these parameters, and assuming the dealer rating meets or exceeds the buyer's requirements, each rSAEJ examines its asset buckets as follows:
Duration: usually static, except that 5 year may have different weight assigned to it than 2 years when computing the risk profile and the corresponding impact on price
Select 'AA' rated bucket of reference entities
Select the desired rated primary insurance company, although there may be more than one such company, and in such cases may optimize the relative ratio of business assigned to each
Select the desired rated secondary insurance company, and again there may be more than one such company and the ratio of the total business allocated to each may be optimized
Compute an optimized floor price using the reference entity base price, subject to its distance from the targets. No bid is made below this amount, thus extracting the maximum possible price from the buyer.
In addition to the optimization performed by the responder, each underwriter may perform its own optimization based on its targets. For example, an underwriter may want to maintain a portfolio with blended weighted average rating of 'A', a weighted average duration of 4 years, a pool capital reserve of 6%, a primary insurance rating of 'AA', a secondary insurance rating of 'A', and a not-to-exceed default rating number of 5. Furthermore, there may be sub-targets for each category. For example, the AAA rated bucket may maintain higher capital reserve and higher primary and secondary insurance coverage. These criteria are used to analyze the impact on targets if the underwriter wins the auction, filter incoming requests, and to dynamically assess premiums while simultaneously minimizing or staying within the risk parameters. Thus an underwriter may define its risk objectives and configure its rSAEJ to maintain $300 B in total CDSs written at the end of Q1 having a ratio of annualized premium collected to notional value of 1.5%. Individual bucket targets may also be specified, such as $100 B in the "AA" bucket, and relative ratios (e.g., $100 B/total portfolio) to the other ratings. Once the 'rSAEJ' has determined that the asset has passed the pre-screening criteria and has computed the optimal price, it iteratively bids such that it does not drop below the optimized price floor. Other approaches that may be used include bidding a price as close as it can to the optimal price along with a corresponding CQE. In some cases, the CQE may be the only determining factor as to which entity wins the auction.]]
***
Option 4

A fourth option builds on the techniques described above by allowing both the 'iSAEJ' and 'rSAEJ' to be dynamically optimizing the prices during the auction. For example, an 'iSAEJ' may fix some variables (e.g., an 'AA" rating and a 5 year duration), but may allow for variability of the primary insurance company rating between a rating from 'A' to 'AAA' and for the secondary insurance company from 'AA' to 'AAA'.. Given these parameters, the initiator may request underwriters to optimize their price around these variables. Such flexibility accounts for the weights assigned to the parameters, as they may be small relative to other parameters.
Option 5

This is similar to Option 4, except that the underwriter requests the auctioneer to conduct an auction among the insurance companies (primary and/or secondary) instead of selecting them based on the risk buckets. Thus, three sets of concurrent auctions occur, in which the result of an auction among secondary insurance companies and the results from an auction among primary insurance companies are used by the underwriter to compute its bid price. Unlike Option 3 above in which the premiums charged by the primary and secondary insurance companies are known, this option allows the primary and secondary insurance company can bid against each other to offer the best prices to the underwriter.
As a result, various embodiments of the invention facilitate the quantitative and transparent measurement of the risk contributions from various entities under many scenarios. The two primary sources of risk the reference entity the underwriter is considered during the pricing process and in a real-time auction using these techniques and systems.

Optimization Mathematical Formulation for the Underwriter

In addition to determining the proper pricing for buyers of CDSs, the underwriters also benefit from using the models, techniques and systems described herein. From the perspective of the underwriter, a buyer specifies its requirements, and the bidders in the auction calculate the optimal prices and combinations of reference entities, primary insurance companies, and secondary insurance companies while maximizing its own profit and adhering to its own defined constraints.

The buyer's requirements (CDS duration, minimum reference entity rating, minimum underwriter capital reserve ratio, etc.) may be used as filtering criteria that determine what assets are offered from the underwriter's portfolio. If the buyer is flexible about certain reference parameters, the related filtering criteria can be relaxed or even removed.

The expected utility gain as described in said such co-pending applications, for participating in an auction, is a function of many variables, and can be expressed as:

$$E(\Delta u) = u(p, y, z, p_y, p_z, \rho, v, d, F, T, t) \tag{7}$$

where:
- p: bid price for the chosen reference entity, a decision variable.
- y: vector spanning over eligible primary insurance companies, decision variable. Element value 1 means the corresponding primary insurance company is chosen, 0 means it is not chosen.
- z: Vector spanning over eligible secondary insurance companies, decision variable. Element value 1 means the corresponding secondary insurance company is chosen, 0 means it is not chosen.
- $p_y$: Insurance premium vector for all eligible primary insurance companies, assumed to be known given the reference entity is chosen.
- $p_z$: Insurance premium vector for all eligible secondary insurance companies, assumed to be known given the reference entity is chosen.
- ρ: Bid response function, which models the market condition and buyer's response behavior and is a function of the price, and/or CQE.
- v: CDS notional value.
- F: Reference entity risk profile vector.
- T: Target vector. Targets are underwriter's objectives for various reference parameters, risk monitoring parameters, underwriter's profit etc.
- t: Accumulated target value vector before participating the particular auction.

If the buyer doesn't specify the reference entity, the underwriter may select the reference entity to bid on. A new decision variable x can be introduced to indicate which reference entity should be used to maximize the underwriter's utility. While there may be many utility functions which can vary from underwriter to underwriter, the objective is to maximize the underwriter's profit, minimize the overall distance to desired targets, and risk control within specified parameters. In one embodiment, the optimization function may be formulated as:

$$\max_{p,y,z}(E(\Delta u)) \tag{8}$$

Some of the constraints used to bound the optimization formula may be categorized as risk-based controls, underwriter constraints, reference entity constraints, and insurer constraints (both primary and secondary). Examples of risk-based constraints include the existence of the requisite capital reserve to cover the assets, average default risk, capital sufficiency index, and differential risk exposure. Underwriter related constraints include minimum liquidity index of reserve, minimum diversification index of reserve, and minimum floor price constraints. Reference entity and insurance constraints include both global and sector constraints, as described above.

The following provides an example of the optimization approach described above. The underwriter's utility function may be expressed as an expected profit or gain from the CDS auction as:

$$E(\Delta u) = \rho(p - y p_y - z p_z - C) \tag{9}$$

where 'C' is the corresponding "Incremental Requisite Capital Reserve" contribution for each CDS. Each underwriter has its own way to estimate C. The optimization problem may be reduced to:

$$\max_{p,y,z}(E(\Delta u)) \tag{10}$$

with examples of constraints listed below in TABLE II.

TABLE II

Differential risk exposure constraint (for risk control)

$$K_L \le \frac{V_t K_t + vk}{V_t + v} - K_0 \le K_H \tag{11}$$

$K_L$: Lower bound of differential risk exposure target.
$K_H$: Higher bound of differential risk exposure target.
$V_t$: Cumulated notional value up to time t.
$K_t$: Average dollar-weighted default risk to time t.
v: Newly requested CDS notional value.
k: Newly requested CDS default risk.
$K_0$: Default risk at origin.

Dollar amount weighted CDS duration $$D_L \le \frac{V_t D_t + vd}{V_t + v} \le D_H \tag{12}$$

$D_L$: Lower bound of weighted global duration target.
$D_H$: Higher bound of weighted global duration target.
$V_t$: Cumulated notional value up to time t.
$D_t$: Weighted duration up to time t.
v: Newly requested CDS notional value.
d: Newly requested CDS duration.

Dollar amount weighted reference entity diversification index $$S_L^x \le \frac{V_t S_t^x + vs^x}{V_t + v} \le S_H^x \tag{13}$$

$S_L^x$: Lower bound of weighted reference entity diversification index target.
$S_H^x$: Higher bound of weighted reference entity diversification index target.
$V_t$: Cumulated notional value up to time t.
$S_t^x$: Weighted diversification index up to time t.
v: Newly requested CDS notional value
$s^x$: Newly chosen reference entity diversification index.

Dollar amount weighted primary insurance company rating $$R_L^x \le \frac{V_t R_t^x + vr^x y}{V_t + v} \le R_H^x \tag{14}$$

$R_L^x$: Lower bound of weighted primary insurance company rating target.
$R_H^x$: Higher bound of weighted primary insurance company TABLE II-continued rating target.
$V_t$: Cumulated notional value up to time t.
$R_i^t$: Weighted rating for primary insurance companies up to time t.
v: Newly requested CDS notional value
$r^x$: Eligible primary insurance company rating vector.
y: Primary insurance company selection vector.

Optimized Parameter Requirements Determination for the Buyer

Using these techniques, the buyer may set targets for various parameters characterizing its CDS portfolio. For example, it may specify average reference entity rating, average primary insurance company rating, and average secondary insurance company rating.

When a decision is made to buy additional CDS, its requisite parameters characteristics are determined by minimizing the overall distance to the targets according to the following formula:

$$d = \sqrt{\sum_i w_i \left( \frac{V^t R_i^t + v r_i}{V^t + v} - R_i^T \right)^2} \quad (15)$$

$V^t$: Cumulated notional value up to time t.
$R_i^t$: Average value of reference parameter i at time t.
$R_i^T$: Target value of reference parameter i.
v: Notional value of next CDS.
$r_i$: Reference parameter i of next CDS.

Implementations

Various embodiments of the invention may be provided as an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Key Advantages

Using the methods and systems described herein, the various embodiments of the invention provide CDS market participants with an innovative, transparent, and automated technique for creating a securitized pool of assets based on various constraints and optimization parameters. As part of this process, reference entity pricing models are substantially enhanced and dealer default risks are identified, quantified, and built into the pricing model. A reverse-auction process, as described in said co-pending applications and publications is used to discover the true CDS price in the market among the various participants. A fully-automated risk control mechanism maintains dealer risk within a specified range, and full visibility is provided subsequent to the transaction to enable any changes at the borrower level to be accounted for and reflected in the current CDS price.

More specifically, the above-described process provides the following benefits and advantages over conventional CDS pricing and trading methodologies.

Buyers can automatically and quantitatively analyze their unique requirements in the context of what is currently owned, their objectives and the distance to their objectives from what is already owned.

The buyer receives not only the price but also the parameter values deemed to be important by the buyer.

The buyer can quantitatively evaluate each CDS price offered in the context of other relevant parameters such as corresponding dealer's reserve capital, sector concentration, primary insurance coverage, secondary insurance coverage etc.

The buyer may assign a unique weight to each parameter.

The buyer can compute the variations between the unique parameters values offered versus what is desired for each of the participating dealers and reduce such variations to a single parameter (the CQE) to facilitate comparison among participating dealers.

The buyer can quantitatively analyze each CQE in conjunction with the corresponding price offered by each of the participating dealers to make a fair comparison.

The buyer can quantitatively asses the magnitude of risk coverage provided by the primary and secondary insurance companies in the event of dealer default The buyer can automatically optimize its own CDS pool at the best price possible at the level of risk deemed acceptable to meet its unique requirements without requiring any manual intervention once configured.

The automated nature of the process eliminates the manual effort, substantially improves the efficiency of the process and is much more cost effective than is currently feasible.

Rating inflation is eliminated providing the buyer with a known risk exposure.

The impact of digital discontinuity on the buyer is eliminated or largely minimized.

For the debt which contains securitized pools underneath, the buyer immensely benefits from the significantly enhanced construction process of such pools For the debt which contains securitized pools underneath, the buyer immensely benefits from the significantly enhanced construction process relying on dollar-weighted analog credit score For the debt comprised of securitized pools, the buyer benefits from the dollar-weighted income level of the borrowers within the pools, debt-to-income ratio of the borrowers, and the use of the true asset value at the origin of the asset.

The buyer no longer is solely reliant on intermediary ratings of the debt quality.

The buyer has visibility into the quality of debt as a function of time

The requisite parameters of the pool and the respective targets and constraints are specified in advance and the pools are created in a manner to meet those requirements thereby creating an optimized pool instead of being built on ad-hoc basis post the acquisition of assets prior to building the pool.

A pre-screen filters out assets that not meet minimum requirements prior to optimization of the pool around the targets in conjunction with respective constraints.

Analog quantification is used (instead of digital quantification) for credit scores, debt to income ratio and to value the assets, which eliminates the impact of digital discontinuity and avoids rating creep-up.

A common rating system is used instead of multiple inconsistent rating systems with varying degree of resolutions.

Computation of a dollar-weighted default risk using a non-linear default curve instead of conventional digitized rating systems.

Pools are constructed using a live auction in real-time, resulting in a true price discovery of the asset.

The process enables securitization of disparate assets while simultaneously evaluating the quality of each debt and true price discovery at a macro level.

Debt default rate is updated as a function of time thus providing full visibility at the lowest borrower level.

The dealer can demand a dollar-weighted analog credit score to eliminate the uncertainty caused by digital discontinuities of conventional rating schemes.

The dealer has access to and can analyze risk parameters beyond the intermediaries and examine the risk profile of the pool at its origin.

The dealer can monitor the debt quality of the pool as a function of time after the CDS has been underwritten.

The system fully automates reference entity pricing by accounting for the default risk of the underwriter and the potential loss of coverage by its primary and secondary insurance companies, thus providing a more meaningful price.

Identification and quantification of risk control parameters and the ability to maintain the parameters within acceptable ranges as defined by the dealer according to its own business objectives.

Risk control parameters such as industry sector distribution provide an additional level of risk control beyond the primary parameters such as capital reserve or dollar-weighted average default rate etc.

Risks due to failure of the primary and/or secondary insurer are accounted for and included in risk monitoring and risk control.

Dynamic risk control proactively optimizes pricing on transactions to keep the parameters such as capital reserve, dollar-weighted average default rates and others within the targeted range both at specific instants and over time.

The risk monitoring and control capabilities enable dealers to maintain an acceptable risk exposure that is consistent with its capital resources and business strategies.

Risk control has a significant impact on the magnitude and direction of modulation of the Reference Entity Price by the price optimization process.

The usage of continuous analog data instead of digitized data allows for linearization of data and eliminates the digital discontinuities due to averaging of the ratings of the reference entities.

Risks of rating inflation due to manipulation of ratings is eliminated or minimized.

To minimize the magnitude of inefficiency in the conventional Over The Counter (OTC) manually negotiated process, a real-time, on-demand, 24×7, iterative, reverse auction is held among the dealers interested in writing the CDS for the benefit of the buyer. Each dealer's SAEJ computes its own optimum bid and at the end of each iteration, the auctioneer sends the best bid of each round to each of the participants, which may then re-bid until a winner is determined. In case of tie, a random number or other mechanisms can be used to break the tie.

In an alternative embodiment, the SAEJs can instead bid using a 'CQE' (Coverage Quality Efficiency), a parameter computed by minimizing the aggregate distance to the buyer's desired parameter values, which in turn may be used to modify the bid price within constraints while maximizing its net gain.

In Option 1, the buyer communicates its desired parameters, some of which may be used to pre-screen the dealer based on, for example, their capital reserve to notional value ratio or their own ratings. The dealers compete based on an optimally computed price as determined by their SAEJ, and results are presented to the buyer. The buyer's SAEJ may select the best price provider as winner or, alternatively, compute a CQE for each result and select the dealer with the best CQE.

In Option 2, the process includes weighting some or all of the parameters, and, like Option 1, each dealer's SAEJ optimally computes a CQE and manages the real-time iterative bidding process.

Option 3 further includes consideration of the many insurance options available to the dealers and capital reserves for each reference entity. This option provides dealers with pricing flexibility while still trying to meet the buyer's requirements. In some embodiments, only those dealers meeting the pre-screen criteria are allowed to bid. In an alternative embodiment, in addition to the pre-screening criteria, the CQE may be used as a determining factor.

In Option 4, buyers provide ranges for some or all of the parameters, as opposed to a single target value.

In Option 5, the dealer initiates a real-time, instantaneous reverse auction among its primary insurance companies to secure the best price prior to incorporating it in its own optimized bid computations for each potential transaction. Similar auctions may also be initiated for secondary insurance.

CONCLUSION

A transparent on-demand, 24×7 real-time iterative auction among many underwriters is thus conducted for this complex multi-variable problem of the invention to discover the true price of the CDS. The underwriter benefits from the reduced exposure to the primary and secondary insurance companies and also provides less risk to those insuring it, thus receiving a better price, benefiting all the parties involved. The primary and secondary insurance companies can optimize their risk/reward ratio while implementing the requisite diversification across many vectors including the number of underwriters and the number of insurance companies and their respective ratings.

The technology, however, can also be applied in other applications where the source of the debt and the offer of the debt are decoupled, such as mortgage holder and those holding the mortgage-backed bonds.

This technology can also be applied to a broad range of applications such as auction rate securities or other similar instruments. It is well suited to securitized portfolios constructed with credit cards, auto loans, student loans or a combination thereof.

Further modifications will also occur to those skilled in this art and are considered to fall within the spirit and scope of the invention as defined in the appended claims.

What is claimed is:

1. A method of providing a fully automated computerized facility for the buying, selling, or pricing of debt-based derivatives that comprises:

providing an automated system amongst a plurality of automated computer engines known as "SAEJ" operating on one or more computer processors over a communication system or network that takes into account many aspects of risk control and includes soliciting from responding SAEJ engines of automatic real-time price quotations, without manual intervention, in response to a buy, sell, or pricing request received from an initiating computer processor;

inputting selected aspects of financial risk control and other parameters to one or more of the SAEJ engines in the SAEJ automated system in order to provide transparency and risk control;

evaluating risk controls after inputting to the SAEJ engines a default risk evaluation of one or more of reference entities, primary insurance companies, and secondary insurance companies;

determining, by one or more of the SAEJ engines, a real-time price quotation; and selecting, by a controlling computer processor or the initiating computer processor in response to the received price quotations, a winning bid and either determining pricing or transacting purchase or sale of the debt-based derivative based on the winning bid;

wherein SAEJ computer processor determination of automatic real-time price quotations includes optimizations which consider at least one of the following constraints: differential risk exposure constraint, $$K_L \leq \frac{V_t K_t + vk}{V_t + v} - K_0 \leq K_H,$$

where $K_L$ is a lower bound of differential risk exposure target, $K_H$ is a higher bound of differential risk exposure target, $V_t$ is cumulated notional value up to time t, $K_t$ is average dollar-weight default risk to time t, v is newly requested credit default swap (CDS) notional value, k is newly requested CDS default risk, and $K_0$ is default risk at origin;

dollar amount weighted CDS duration, $$D_L \leq \frac{V_t D_t + vd}{V_t + v} \leq D_H,$$

where $D_L$ is a lower bound of weighted global duration target, $D_H$ is a higher bound of weighted global duration target, $V_t$ is cumulated notional value up to time t, $D_t$ is weighted duration up to time t, v is newly requested CDS notional value, and d is newly requested CDS duration;

dollar amount weighted reference entity diversification index, $$S_L^x \leq \frac{V_t S_t^x + vs^x}{V_t + v} \leq S_H^x,$$

where $S_L^x$ is a lower bound of weighted reference entity diversification index target, $S_H^x$ is a higher bound of weighted reference entity diversification index target, $V_t$ is cumulated notional value up to time t, $S_t^x$ is weighted diversification index up to time t, v is newly requested CDS notional value, and $s^x$ is newly chosen reference entity diversification index; and dollar amount weighted primary insurance company rating, $$R_L^x \leq \frac{V_t R_t^x + vr^x y}{V_t + v} \leq R_H^x,$$

where $R_L^x$ is a lower bound of weighted primary insurance company rating target, $R_H^x$ is a higher bound of weighted primary insurance company rating target, $V_t$ is cumulated notional value up to time t, $R_t^x$ is weighted rating for primary insurance companies up to time t, v is newly requested CDS notional value, $r^x$ is eligible primary insurance company rating vector, and y is primary insurance company selection vector.

2. The method of claim 1 further comprising inputting, to one of more of the computer processors of the SAEJ engines, a risk position of failure of the underwriter of or dealer in the derivative.

3. The method of claim 2 wherein a seller is an investment bank acting as an underwriter and dealer and guarantor to a buyer should a reference entity default on the debt.

4. The method of claim 3 further comprising the seller purchasing insurance from a primary and/or secondary insurer to cover its risk should the reference entity default, or if the seller's capital reserve is insufficient to pay against demand, or in the event of other major market fluctuations.

5. The method of claim 1 further comprising at least one of the computer processors of the SAEJ pre-screening the debt instrument to determine whether it meets specified criteria for a securitized pool, giving consideration to credit score and other criteria evaluated in the context of optimized objectives for the pool.

6. The method of claim 5 further comprising at least one of the computer processors of the SAEJ pre-screening based on its own unique objectives and computing a price quotation for the derivative instrument if it meets pre-screening criteria.

7. The method of claim 6 wherein when a request is received by the SAEJ of a dealer, the one or more computer processors of the dealer SAEJ consider the sector of the request for decision as to acceptance in the asset pool in order to maintain the relative ratio among the various sectors so that any dramatic decline in one does not severely distress the entire portfolio.

8. The method of claim 7 further comprising at least one computer processor of the SAEJ engines modulating the price of the debt-based instrument for each reference entity based upon one or more of the dealer's default coverage, the rating quality of the primary and/or secondary insurance, the magnitude of reserve capital diversification, the sector diversification, and the competitive market pricing at that instant in time, coupled with the dealers status with regard to its own unique targets and the time left to meet the same.

9. The method of claim 8 further comprising operating an on-line market place in which the debt instrument buyers, sellers and entities such as the primary and secondary insurance companies, participate in a real-time auction with comprehensive pricing models encompassing various risk parameters associated with the market participants used in the SAEJ calculations of an optimum price.

10. The method of claim 9 further comprising the controlling computer processor finding the best price quotation amongst the SAEJ engines and sending it back to each of the responders to determine if anyone can beat the best value offered so far, each responding SAEJ evaluating the best price quotation received in the first round, re-computing its best price quotation and determining if it can beat such price, whereupon it then resubmits its progressively lower price quotation, such that this iterative and competitive process is automatically repeated in real-time until only one responder is left.

11. The method of claim 5 further comprising at least one of the computer processors of the SAEJ creating a securitized pool and specifying respective targets and constraints in advance such that the pools are created to meet requirements, thereby creating an optimized pool instead of one built up on an ad-hoc basis following the acquisition of assets and prior to building the pool.

12. The method of claim 11 further comprising pre-screening assets that do not meet minimum requirements prior to optimization of the pool around specified targets and respective constraints.

13. The method of claim 11 further comprising at least one of the computer processors of the SAEJ, in order to implement risk monitoring and control, optimizing quantitative business objectives based on targets for one or more of respective capital reserves, how much risk is to be taken, and what is the average rating of the debt already written.

14. The method of claim 13 wherein implementation of risk monitoring and control further uses a coverage quality efficiencies parameter computed by minimizing the aggregate distance to the buyer's desired target values.

15. The method of claim 14 further comprising the SAEJ of each dealer optimally computing the coverage quality efficiency parameter and manages the real-time quotation process with weighting of some or all parameters provided by an initiator SAEJ (iSAEJ).

16. The method of claim 14 further comprising the SAEJ computer processor of each dealer initiating a real-time instantaneous reverse auction among its primary insurance companies to secure the best price prior to incorporating it in its own optimized price quotation computation for each potential transaction.

17. The method of claim 15 further comprising the iSAEJ providing ranges for some or all of the parameters, as distinguished from a single target value.

18. The method of claim 15 further comprising the iSAEJ analyzing what is currently owned to identify remaining objectives and distance in order to provide the parameters.

19. The method of 18 wherein the parameters provided by the iSAEJ include at least one of corresponding dealer's reserve capital, sector concentration, primary insurance coverage, and secondary insurance coverage.

20. The method of claim 18 further comprising the iSAEJ identifying the parameters of importance to provide for the real-time quotation process.

21. The method of claim 20 further comprising the iSAEJ computing variations between values offered and what is desired for each participating dealer in order to determine each dealer's coverage quality efficiencies parameter.

22. The method of claim 21, further comprising the iSAEJ analyzing each coverage quality efficiencies parameter in conjunction with a price offered by a corresponding dealer in order to compare quotations from all dealers.

23. The method of claim 15, further comprising the iSAEJ assigning a unique weight to each of the provided parameters.

24. The method of claim 8 further comprising updating debt default rate as a function of time, thus providing visibility at the lowest borrower level.

25. The method of claim 24 further comprising providing one or more of the SAEJ engines access for analyzing of risk parameters and for examining the risk profile of the pool at the origin.

26. The method of claim 25 further comprising monitoring, by at least one of the computer processors of the SAEJ, the quality of the pool as a function of time after the debt-based derivative has been underwritten.

27. The method of claim 26 further comprising automating, by one more of SAEJ engines, reference entity pricing by accounting for at least one of the default risk of the underwriter and the potential loss of coverage in primary and/or secondary insurance, thus providing a meaningful price.

28. The method of claim 27 further comprising identifying and quantifying of risk control parameters to maintain the parameters within acceptable ranges as defined by the dealer according to its own business objectives.

29. The method of claim 28 further comprising conducting, by the controlling computer processor, a transparent on-demand, 24×7, real-time iterative auction between the responding SAEJ engines to discover the price of the debt-based derivative.

30. The method of claim 28 further comprising at least one of the SAEJ engines computing targets indicating optimum risk to take given an input capital reserve, and using those calculated risk targets for generating or evaluating price quotations of the debt-based derivative.

31. The method of claim 30 further comprising at least one of the computer processors of the SAEJ engines changing the amount of risk under monitoring feedback control of the SAEJ.

32. The method of claim 30 further comprising at least one of the SAEJ engines applying risk control to the price of the debt-based derivative and determining if the capital reserve warrants this risk and keeps the risk within narrow confines.

33. The method of claim 32 further comprising constructing a securitized pool of assets with a disconnect between the borrower and the lender effected by providing full visibility in the construction of the pools.

34. The method of claim 30, further comprising one or more of the SAEJ engine processors controlling the risk with feedback provided on a dynamic basis to prevent runaway of the risk.

35. The method of claim 28 further comprising at least one SAEJ engine processors computing requisite capital reserve given an input risk, and factoring the computed reserve in pricing or decision to participate in any transaction.

36. The method of claim 5 further comprising at least one of the computer processors of the SAEJ engines using analog quantification instead of digital for one or more of credit scores, debt-to-income ratio, price or value of the assets, and borrower income level, thereby eliminating the impact of digital discontinuity and avoiding rating creep-up.

37. The method of claim 1, further comprising decoupling, by one or more of the SAEJ computer processors, reference entity pricing from the entity issuing the debt-based derivative and using the decoupled pricing for determining or monitoring, by the SAEJ computer processors, the real-time price quotation.

38. The method of claim 37 wherein the decoupling of the borrower from the entity issuing the debt further eliminates rating inflation due to digital discontinuities.

39. The method of claim 1 further comprising at least one of the SAEJ engines constructing a securitized pool including the debt-based derivative and optimized for one or more of credit scores, debt-to-income ratio, value of the assets, and borrowers income level, and using the constructed securitized pool for generating or evaluating price quotations.

40. The method of claim 39, further comprising one or more of the SAEJ engine processors measuring change of debt quality over time in the securitized pool based on change related to one or more underlying assets.

41. The method of claim 39, further comprising one or more of the SAEJ engine processors dollar-weighting at least one of the credit scores, debt-to-income ratio, value of the assets, or borrowers income level used in pool construction.

42. The method of claim 1 wherein constraints on the pricing and of the optimization function are categorized as at least one of risk-based controls, underwriter constraints, reference entity constraints, and insurer constraints, and in which the risk-based constraints include the existence of one or more of the requisite capital reserve to cover the assets, the average default risk, and the capital sufficiency index; the underwriter related constraints include one or more of the minimum liquidity index or reserve, the minimum diversification of reserve and the minimum floor price constraints; the reference entity constraints includes one or more of global and sector constraints; and the insurance constraints include one or more of global and sector constraints.

43. A system for providing a fully automated facility for the buying, selling, or pricing of debt-based derivatives comprising:
controller computer processor having non-transitory storage with instructions programming the processor to communicate with a plurality of automated computer engines known as "SAEJ" connected over a computerized communication system taking into account many aspects of risk control, and solicit from the SAEJ engines of their automatic real-time price quotations without manual intervention;
one or more computer processors within the SAEJ computer engines, the SAEJ computer engines having non-transitory storage with instructions programming the processors to:
receive inputs of selected aspects of financial risk control and other parameters to provide transparency and risk control;
evaluate risk controls after receiving a default risk evaluation of one or more of reference entities and of any primary and/or secondary insurance companies; and
determine the real-time price quotation by optimizing a price of a debt-based derivative while considering at least one of the following constraints:
differential risk exposure constraint, $$K_L \leq \frac{V_t K_t + vk}{V_t + v} - K_0 \leq K_H,$$

where $K_L$ is a lower bound of differential risk exposure target, $K_H$ is a higher bound of differential risk exposure target, $V_t$ is cumulated notional value up to time t, $K_t$ is average dollar-weight default risk to time t, v is newly requested credit default swap (CDS) notional value, k is newly requested CDS default risk, and $K_0$ is default risk at origin;
dollar amount weighted CDS duration, $$D_L \leq \frac{V_t D_t + vd}{V_t + v} \leq D_H,$$

where $D_L$ is a lower bound of weighted global duration target, $D_H$ is a higher bound of weighted global duration target, $V_t$ is cumulated notional value up to time t, $D_t$ is weighted duration up to time t, v is newly requested CDS notional value, and d is newly requested CDS duration;
dollar amount weighted reference entity diversification index, $$S_L^x \leq \frac{V_t S_t^x + vs^x}{V_t + v} \leq S_H^x,$$

where $S_L^x$ is a lower bound of weighted reference entity diversification index target, $S_H^x$ is a higher bound of weighted reference entity diversification index target, $V_t$ is cumulated notional value up to time t, $S_t^x$ is weighted diversification index up to time t, v is newly requested CDS notional value, and $s^x$ is newly chosen reference entity diversification index; and
dollar amount weighted primary insurance company rating, $$R_L^x \leq \frac{V_t R_t^x + vr^x y}{V_t + v} \leq R_H^x,$$

where $R_L^x$ is a lower bound of weighted primary insurance company rating target, $R_H^x$ is a higher bound of weighted primary insurance company rating target, $V_t$ is cumulated notional value up to time t, $R_t^x$ is weighted rating for primary insurance companies up to time t, v is newly requested CDS notional value, $r^x$ is eligible primary insurance company rating vector, and y is primary insurance company selection vector;
wherein the controlling processor or an initiating computer processor selects, in response to the received price quotations, a winning bid and either determines pricing or transacts purchase or sale of the debt-based derivative based on the winning bid.

44. The system of claim 43 wherein the SAEJ engine computer processors are further programmed to decouple reference entity pricing from the entity issuing the debt-based derivative and use the decoupled pricing while optimizing the price.

45. The system of claim 44 wherein one of the SAEJ engines is controlled by a seller of the debt-based derivative, and the seller purchases insurance from a primary and/or secondary insurer to cover its risk should the reference entity default, or if the seller's capital reserve is insufficient to pay against demand, or in the event of other major market fluctuations.

46. The system of claim 43 wherein at least one computer processor of the SAEJ engines is programmed to provide a pre-screener to prescreen the debt instrument to determine whether it meets specified criteria for a securitized pool, giving consideration to credit score and other criteria evaluated in the context of optimized objectives for the pool.

47. The system of claim 46 wherein at least one of the SAEJ computer processors is further programmed for one or more pre-screening criteria based on its own unique objectives, and computes a price quotation amount if the derivative instrument meets the pre-screening criteria.

48. The system of claim 47 wherein at least one of the SAEJ computer processors is further programmed to determine a sector of the debt-based derivative, and determines whether to compute or evaluate a price for the debt-based derivate based on maintaining a relative ratio among various sectors of an asset pool controlled by a buyer or seller associated with the SAEJ, so that any dramatic decline in one does not severely distress the entire portfolio.

49. The system of claim 48 wherein at least one of the SAEJ computer processors is further programmed to compute and modulate the price of the debt-based instrument for each reference entity based upon one or more of the dealer's default coverage, the rating quality of the primary and/or secondary insurance, the magnitude of reserve capital diversification, the sector diversification, and the competitive market pricing at that instant in time, coupled with the dealers status with regard to its own unique targets and the time left to meet the same.

50. The system of claim 49 further comprising an on-line market place connected to the controller processor and SAEJ, in which the debt instrument buyers, sellers and entities such as the primary and secondary insurance companies, participate in a real-time auction with comprehensive pricing models encompassing various risk parameters associated with the market participants used in the SAEJ calculations of an optimum price.

51. The system of claim 50 wherein the controller computer processor is further programmed to find the best price quotation amongst the SAEJ engines and send it back to each of the responder SAEJs to determine if anyone can beat the best value offered so far, each responding SAEJ evaluating the best price quotation received in the first round, re-computing its best price quotation and determining if it can beat such price, whereupon resubmitting its progressively lower price quotation, such that this iterative and competitive process is automatically repeated in real-time until only one responder is left.

52. The system of claim 46 wherein the securitized pool is created and respective targets and constraints are specified in advance such that the pools are created to meet these requirements, thereby creating an optimized pool instead of one built up on an ad-hoc basis following the acquisition of assets and prior to building the pool.

53. The system of claim 52 wherein pre-screening filters out assets that do not meet minimum requirements prior to optimization of the pool around specified targets and respective constraints.

54. The system of claim 52 wherein at least one of the SAEJ computer processors is further programmed to measure debt quality of the securitized pool over time based on change related to one or more underlying assets.

55. The system of claim 46 wherein at least one of the SAEJ computer processors is further programmed to access and analyze risk parameters beyond intermediaries, and examine the risk profile of the pool at the origin.

56. The system of claim 46 wherein the at least one of the SAEJ computer processors is further programmed to monitor the quality of the pool as a function of time after the debt-based derivative has been underwritten.

57. The system of claim 56 wherein at least one of the SAEJ computer processors is further programmed to automate reference entity pricing by accounting for one or more of the default risk of the underwriter and the potential loss of coverage in any primary and/or secondary insurance, thus providing a meaningful price.

58. The system of claim 57 wherein at least one of the SAEJ computer processors is further programmed to identify and quantify risk control parameters to maintain the parameters within acceptable ranges as defined according to its own business objectives.

59. The system of claim 58 wherein the initiator, controller, and SAEJ provide a transparent on-demand, 24×7 real-time iterative auction to discover the price of the debt-based derivative.

60. The system of claim 43 wherein at least one of the SAEJ computer processors uses analog quantification, instead of digital, for one or more of credit scores, debt-to-income ratio, price or value of the assets, and borrower income level, thereby eliminating the impact of digital discontinuity and avoiding rating creep-up.

\* \* \* \* \*